US007689908B2

(12) United States Patent  
Yan et al.

(10) Patent No.: US 7,689,908 B2  
(45) Date of Patent: Mar. 30, 2010

(54) METHOD AND SYSTEM FOR A TARGET DEVICE DISPLAY SIMULATION

(75) Inventors: Xin Yan, Bellevue, WA (US); Keira Amos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1220 days.

(21) Appl. No.: 11/047,455

(22) Filed: Jan. 31, 2005

(65) Prior Publication Data

US 2006/0174217 A1 Aug. 3, 2006

(51) Int. Cl.  
*G06F 17/00* (2006.01)

(52) U.S. Cl. .................... 715/238; 715/253; 715/762; 715/788; 715/815; 715/864

(58) Field of Classification Search ............... 715/762, 715/229, 238, 253, 788, 815, 864  
See application file for complete search history.

(56) References Cited

U.S. PATENT DOCUMENTS

| 4,631,691 | A | * | 12/1986 | Pica | 382/280 |
|---|---|---|---|---|---|
| 5,426,594 | A | * | 6/1995 | Wright et al. | 709/206 |
| 6,232,966 | B1 | * | 5/2001 | Kurlander | 715/764 |
| 7,222,306 | B2 | * | 5/2007 | Kaasila et al. | 715/801 |
| 7,385,615 | B2 | * | 6/2008 | Vale et al. | 345/660 |
| 2002/0087300 | A1 | * | 7/2002 | Patwari | 703/22 |
| 2002/0089549 | A1 | * | 7/2002 | Munro et al. | 345/835 |
| 2002/0149588 | A1 | * | 10/2002 | Babcock | 345/468 |
| 2004/0027326 | A1 | * | 2/2004 | Hays et al. | 345/106 |
| 2004/0027377 | A1 | * | 2/2004 | Hays et al. | 345/760 |
| 2004/0027378 | A1 | * | 2/2004 | Hays et al. | 345/763 |
| 2004/0122650 | A1 | | 6/2004 | Masushige | |
| 2004/0177323 | A1 | | 9/2004 | Kaasila | |
| 2005/0012760 | A1 | * | 1/2005 | Yamamoto | 345/636 |

OTHER PUBLICATIONS

Kymin, Jennifer "Using Points, Pixels, Ems, or Percentages for CSS Fonts", About.com, Sep. 3, 2004 http://webdesign.about.com/library/weekly/aa042803a.htm.*  
Kramer, Nick "How to Write High-DPI Applications" Microsoft Corporation, Mar. 2001 http://msdn.microsoft.com/en-us/library/ms969894.aspx.*  
Sun Microsystems, et al., User's Guide, Wireless Toolkit, Version 2.1, Java (TM) 2 Platform, Micro Edition, Dec. 2003, XP002325476, Retrieved from Internet: URL:http://java.sun.com, 90 pages.

* cited by examiner

*Primary Examiner*—Adam M Queler  
(74) *Attorney, Agent, or Firm*—Woodcock Washburn LLP

(57) ABSTRACT

A method of viewing a high resolution display on a low resolution development system display for a digital device includes selecting a target device and identifying an image form for the selected device. An image form displays a realistic form of the selected target device. A form factor is selected which represents the display capabilities of the target device. The image form size is adjusted such that the developer may see text in proper proportion to the image form so as to simulate the look of the high resolution display of the target device. Object code for the target device is generated which contains the proper font size to correspond to the image form and font on the development display.

20 Claims, 6 Drawing Sheets

METHOD AND SYSTEM FOR A TARGET DEVICE DISPLAY SIMULATION

CROSS REFERENCE TO RELATED APPLICATIONS

This application shares some subject matter with co-owned U.S. patent application Ser. No. 10/922,580, filed Aug. 20, 2004, entitled "Form Skin And Design Time WYSIWYG For .Net Compact Framework" and is incorporated herein by reference in its entirety.

FIELD OF THE INVENTION

The invention relates to the field of computer programming. More specifically, the invention relates to visual programming environments for creating software designed to run on target digital devices.

BACKGROUND OF THE INVENTION

An increasing number of portable computer devices are available in the market. These devices include handheld or pocket sized computers, phones and personal digital assistants of various form factors and capabilities. As the computing power and memory capabilities of the handheld devices increase, users are demanding access to more powerful software applications.

Programmers attempting to program complex software applications quickly find that traditional visual software development systems are unsuitable for programming applications to run on the myriad of devices available. Specifically, given the multitude of variations of interfaces, screen sizes, and resolutions among the handheld devices, it can be very difficult for a programmer to ensure that a particular chosen graphical user interface (GUI) of the handheld will appear and work correctly on multiple devices. For example, the display and functionality of the target device is often not well reflected in the capabilities of the development system.

Typically, programmers of handheld devices alternate between first programming on a desktop development system and then running the newly developed software on an emulator of the handheld device, or the actual device, to see if the handheld GUI operates as expected. This can be time consuming and inefficient, especially if a programmer wishes to port the application to a wide variety of portable devices. In one aspect of programming, the typical development environment may allow a handheld device programmer to generate text on a development system with low resolution display. But, when object code for that text is displayed on a high resolution display of a handheld device, the display is at least partially unusable because of the display and programming differences between the development system and the target device.

FIG. 1a depicts a display of a handheld digital device as rendered on a development system. In the FIG. 1 depiction, it is assumed that the development system display device has a lower resolution than the target device. For example, the low resolution development system may have a linear density of 96 DPI which corresponds to a character length of 96 linear pixels per inch, and the target device display matrix is set to 240×320 pixels on the development system. The target of the development system is a handheld digital device, such as a personal digital assistant, a GPS receiver processor, a telephone, a pocket PC or other type of digital devices having a high resolution display. The high resolution display may be a 480×640 pixel matrix with a linear density of 192 DPI which corresponds to a character length of 192 linear pixels per inch.

FIG. 1a includes a display 100 of a handheld digital device screen 110 having a softkey menu bar 150 and a user defined text box 120 at an anchor location of 50×50 pixels 130. The size of the text box 120 is 100×50 pixels. The development system display 100 shows that four characters 140 are displayed in the text box 120. It is assumed that the development system display has a lower resolution than the target digital device. If no accommodation is made for the high resolution display during development of display software for the handheld device, then an error in the final display for the actual handheld digital device can take place.

FIG. 1b displays the prior art error that can result from a failure to accommodate the display differences between a low resolution development system display and a high resolution target device realization. FIG. 1b depicts a resulting display 110'. Here, the size of the text box 120' is changed from the development system size. The anchor location 130' at 50×50 pixels is unchanged. But, because the high resolution target device has more available pixels across the width and height of the display screen area, the physical location of the anchor 130' is closer to the corner of the display screen than in the development system display of 110 FIG. 1a.

The text displayed 140' on the high resolution display of the handheld digital device appears cut off and only partially present on the high resolution display. This is due to the reduced size of the text box. Clearly, if the development system did not automatically accommodate for the differences between a development system resolution and a target device resolution, then errors in the display can occur forcing iterations of development to reach a desired display for a target high resolution handheld device.

Thus, there is a need for a "what you see is what you get" (WYSIWYG) development system for a handheld device which properly simulates the text that a high resolution handheld digital device can produce. The present invention addresses the aforementioned needs and solves them with additional advantages as expressed herein.

SUMMARY OF THE INVENTION

An aspect of the invention includes a development system that can produce a real time view of a target digital device such that a developer can perceive what the actual device will look and feel like when operating the handheld device with a new application. In order to accomplish this, a development system displays an image form of the targeted handheld digital device and manipulates the development system display of the handheld device to indicate text sized proportionally to the image form so that a high resolution display may be simulated. Output code for the developed text is generated such that the resulting display on the handheld device is similar in proportion to that seen by the developer on the development system. In a further aspect of the invention, developed text can be defined addressing one resolution of one target device and then changed to accommodate either a different resolution on the same device or a different target device thus allowing design re-use.

BRIEF DESCRIPTION OF THE DRAWINGS

The foregoing summary, as well as the following detailed description of exemplary embodiments, is better understood when read in conjunction with the appended drawings. For the purpose of illustrating embodiments of the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

In one embodiment of the invention, a target digital device having a high resolution display is simulated a development system having a low resolution display. The invention may also be embodied in an application where the target digital device has a low resolution compared to the resolution of the display of the development system. The development system is used by handheld device developers for the generation of text and new applications for handheld digital devices. One advantage of the present invention is the ability of the user/developer to view the handheld device in a manner that depicts a high resolution aspect of the target device. This high resolution simulation using a low resolution display, or the reverse, allows the developer to immediately see how the target device will display the development text or application and thus saves both total development and debug time. Although examples of target digital devices included herein include handheld digital devices, the present invention is suitable for any embedded device application having a display that is different in resolution from the respective development system. Examples of such embedded device applications include, but are not limited to, non-handheld devices such as airline kiosks, gas pumps, cash registers, telephone or other telecommunications system displays.

Exemplary Embodiments of the Invention

Figure 2A:
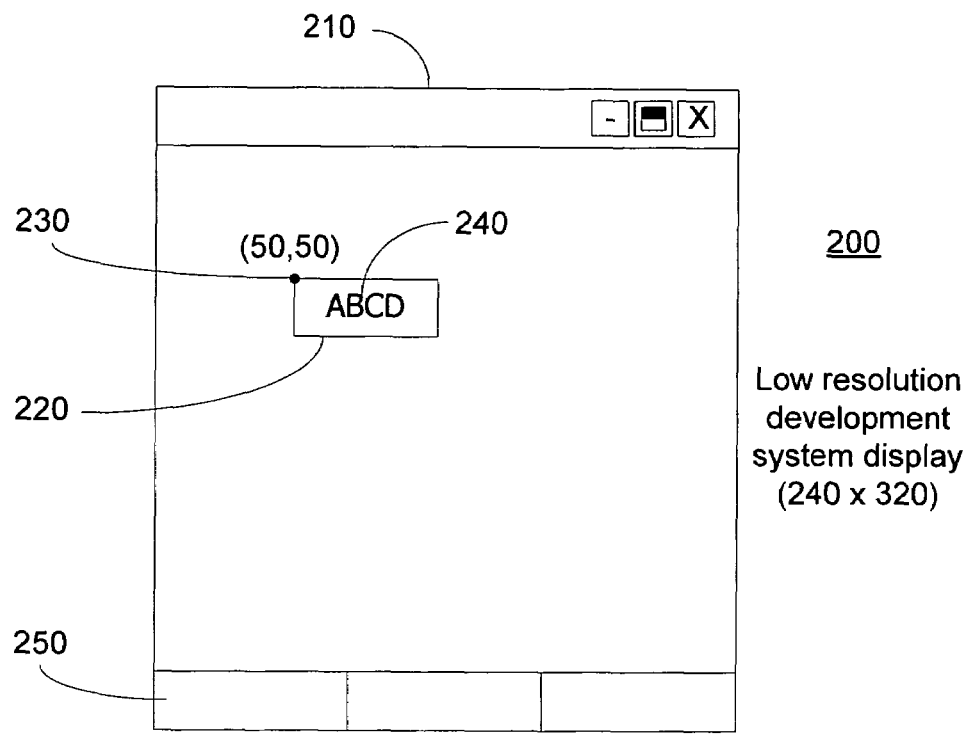
FIG. 2a is an exemplary portion of a target device as seen on a low resolution development system display.

FIG. 2a is a depiction of a low resolution development system display 200. In this example, the display of the development system is 240×320 pixels. The display 200 includes a simulation of the display screen of a handheld digital device 210 having a softkey menu bar 250. A text box 220 is shown having text 240 inserted. An anchor 230 for the text box 220 is located at 50×50 pixels. It is assumed that the designer located the text box 220 to be specifically located at a position in the display 210 to accommodate aesthetic and other elements of the display design. It is desirable to have the high resolution display of the target digital device have the text, the text box size, and the relative geometric position of the text box preserved from the simulated development system display to the final high resolution display.

Figure 1A:
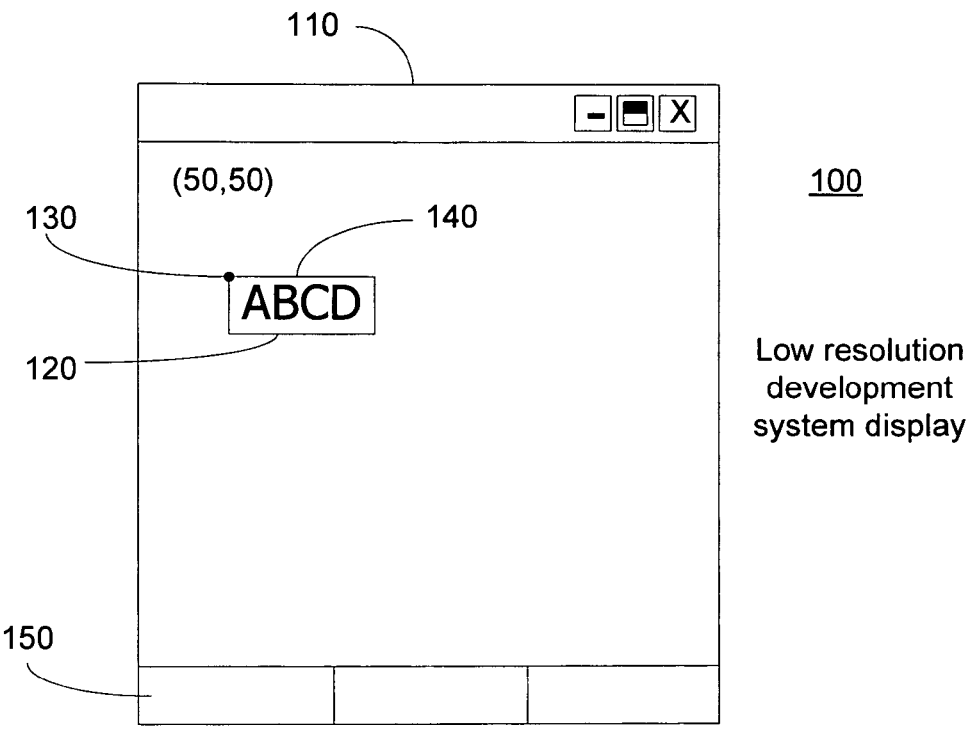
FIG. 1a is an exemplary portion of a target device as seen on a low resolution development system display.
Figure 1B:
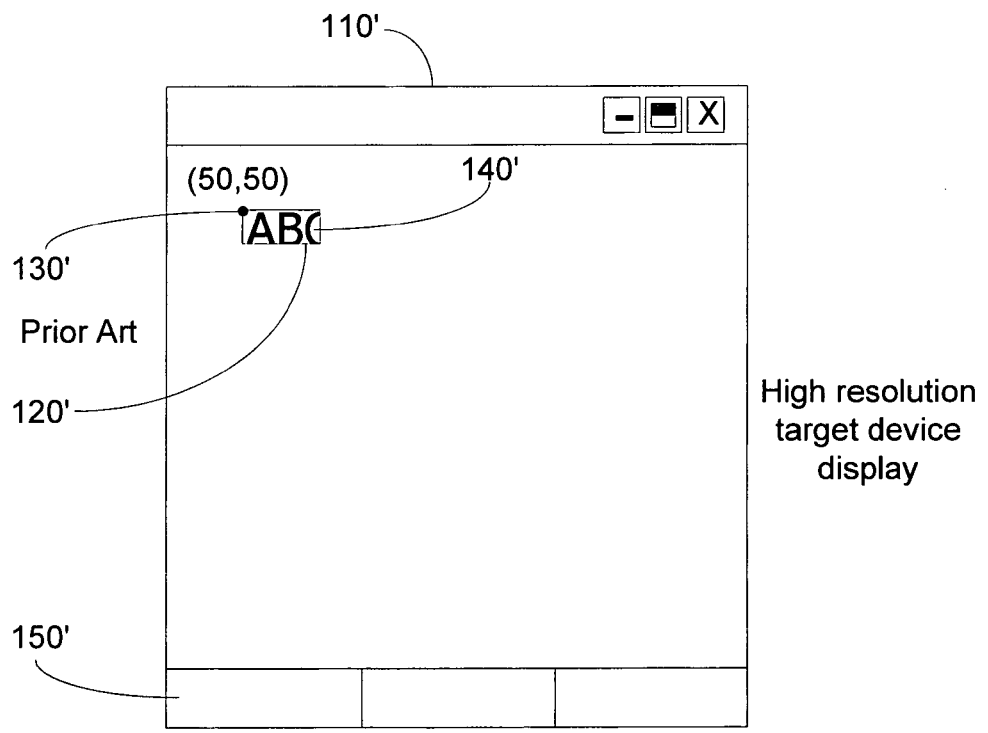
FIG. 1b is a prior art result of generating a high resolution target display using a low resolution development system display.
Figure 2B:
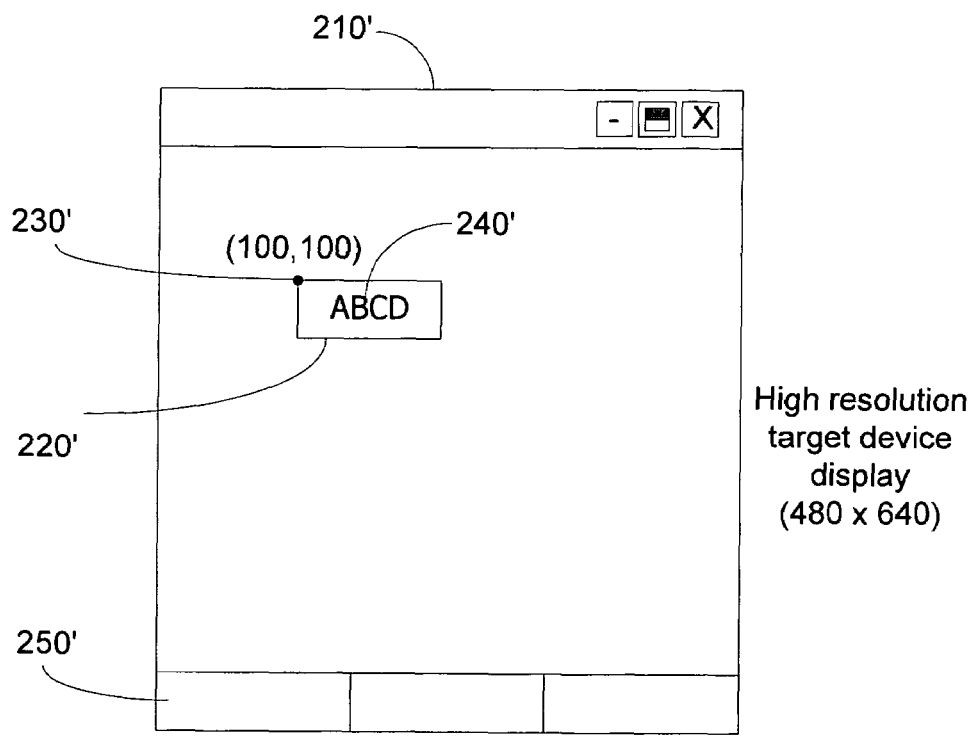
FIG. 2b is a high resolution target device display result having aspects of the invention.

FIG. 2b depicts the corresponding high resolution display 210' resulting from the development system representation of the display 210 using aspects of the current invention. In this example, the resolution of the high resolution display is 480×640 pixels. The high resolution display has softkey menu 250' and a text box 220' that has double the pixel size as the simulation on the development system in FIG. 2a. However, according to an aspect of the invention, the relative geometric position of the text box 220' from the development system to the high resolution display has been preserved by locating the anchor 230' at a location of 100×100 pixels. This location is a result of the high resolution display being twice as dense as the low resolution development system display. The text characters 240' are readable in the text box 220' in a fashion similar to that of the development system display text characters 240. The resulting handheld device display 210' of FIG. 2b is a desirable direct outcome of the development system display generated by the developer and avoids the prior art errors shown in FIG. 1b.

Figure 3A:
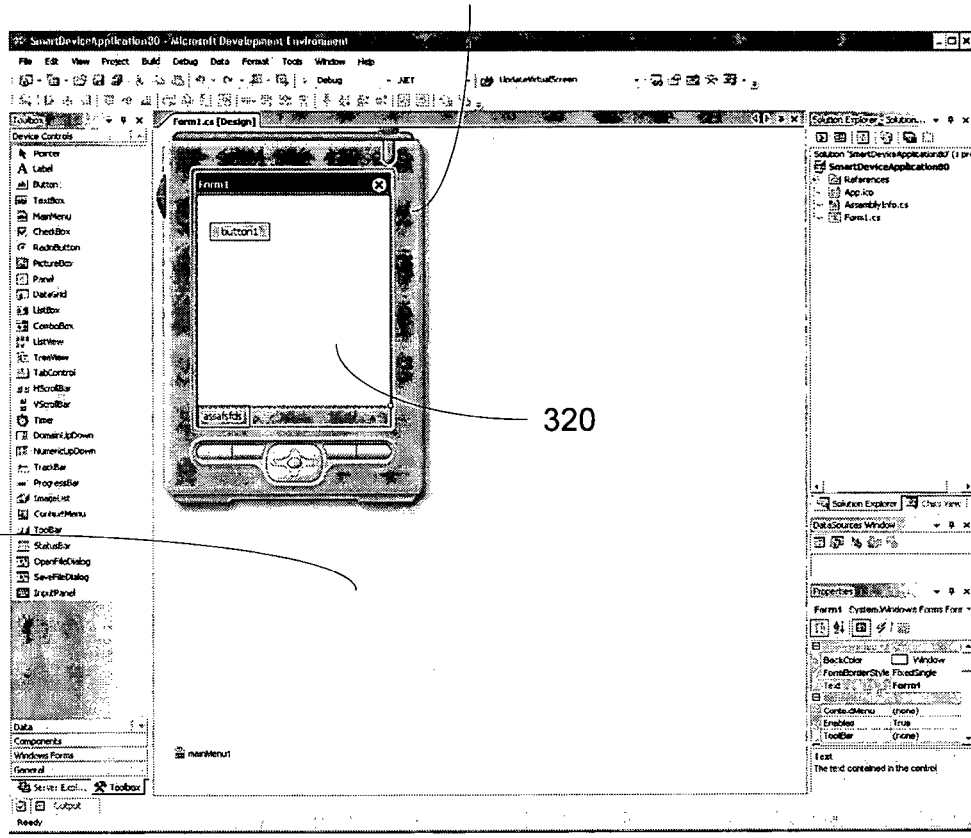
FIG. 3a is an example screen shot showing an image body of a target device on a development system.

In order to achieve the desirable "what you see is what you get" result shown in FIG. 2b, the resolution of the development environment and the resolution of the target high resolution device are preferably known and accommodated. FIG. 3a depicts a screen shot 300 of a target device 310. The development environment includes a display area 320 of the digital handheld device. The inherent problem with the development environment is that its display can only have the resolution set by the native resolution of the display screen 330 of the development environment. The resolution of the digital handheld device may be either higher or lower than the native resolution of the display screen 330 of the development environment.

Figure 3B:
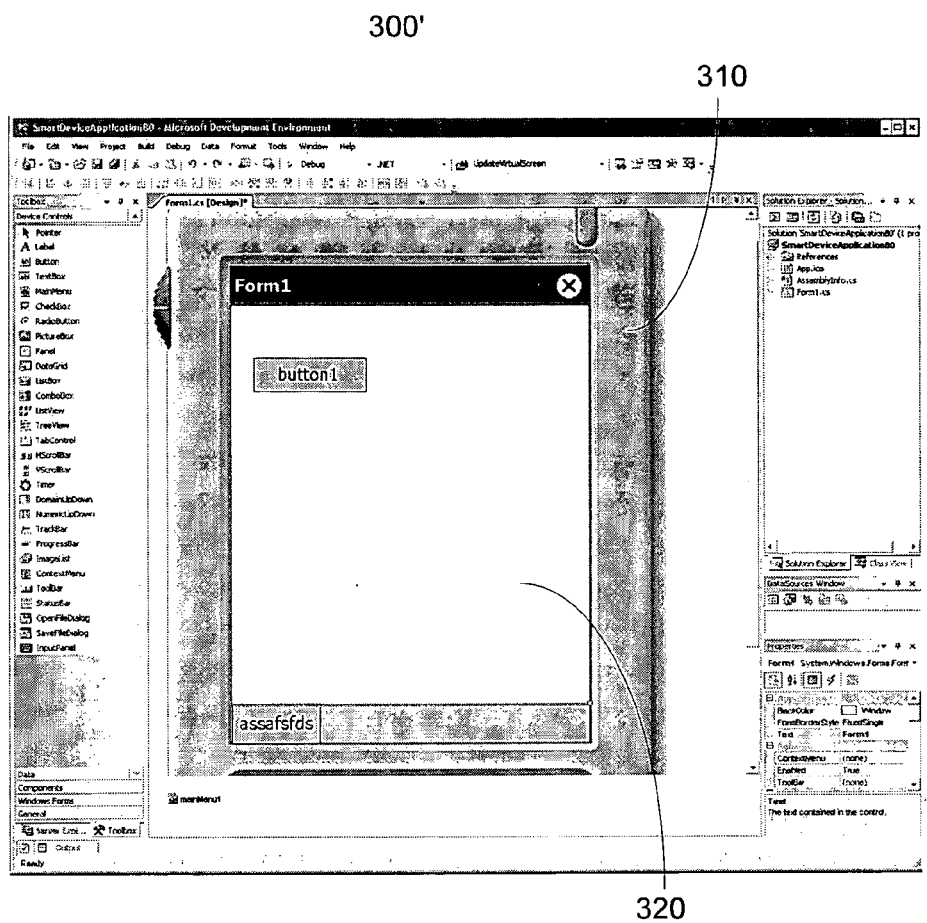
FIG. 3b is an example screen shot of a development system targeting a high resolution device showing aspects of the invention.

One aspect of the current invention is that after the resolution or form factor of the handheld digital device is selected, the form factor may be used to re-scale the display of the image form of the handheld digital device to simulate a high resolution display on a lower resolution development system. FIG. 3b depicts the handheld device image form 310 of FIG. 3a after scaling of the device image to accommodate proper proportional display of a font size on the high resolution display area 320. Although the development environment depicts a display for the digital handheld device that is larger than actual size, it accurately depicts the text size and detail that results from the use of a high resolution device proportionally with the image form of the handheld device 310.

A conversion algorithm is used to determine the approximate font size to use for the development system display in the high resolution simulation. The conversion algorithm is:

development display font size=(target font size)×(target device resolution DPI/development display DPI)

The development display font is the font that the low resolution display of the development system should display for the simulation of a high resolution device. The target font is the desired font to be displayed on the high resolution screen of the target device. The high resolution DPI is the linear pixel density, measured in DPI, that the target device will display. The development system display DPI is the linear pixel density of the low resolution development system display. The algorithm allows a font size to be calculated that corresponds to a form factor (size) of an image form (image of the target device). This is done so that a developer may view the handheld device image form in a manner that renders a proportionally sized font simulating a high resolution display.

A form factor may be defined as a device type and may have the following properties:

A name. For example, Pocket PC 2003 VGA Portrait.

A device screen size, in pixels. For example, Pocket PC VGA Portrait has a screen size of (480×640).

A device screen resolution expressed in DPI. For example, normal, low resolution device has 96 DPI. High resolution Pocket PC has 192 DPI and a high resolution Smart-Phone has 131 DPI.

Each device may have it's own form factor or a single device may have multiple form factors corresponding to different levels of resolution. Example of form factors for devices include:

Pocket PC 2002, 240×320, 96 DPI
Pocket PC 2003 Portrait, 240×320, 96 DPI
Pocket PC 2003 Square, 240×240, 96 DPI
Pocket PC 2003 VGA Portrait, 480×640, 192 DPI
Pocket PC 2003 VGA Square, 480×480, 192 DPI
Smartphone 2003, 176×220, 96 DPI
Smartphone 2003 QVGA, 240×320, 131 DPI
Windows CE .NET compatible devices (multiple resolutions, default to 96 DPI, 640×480).

In one aspect of the invention, a selected target device or a form factor for the target device may be changed and text that was developed for one target device or form factor may be reused for another target device or form factor. Software structure support for the form factor may be found in the following XML schema (XSL) code segments. Those of skill in the art will recognize that the schemas defined below are exemplary and as such are non-limiting.

Platform Level Property

```
<xsl:attribute name="DefaultFormFactor">
POCKET_PC_2003_PORTRAIT
</xsl:attribute>
```

Create a Form Factors Container under Each Platform

```
<FORMFACTORCONTAINER>
<xsl:element name="FORMFACTOR">
    <xsl:attribute name="Name">user friendly name</xsl:attribute>
    <xsl:attribute name="ID">invariant form factor name</xsl:attribute>
    <PROPERTYCONTAINER>
        <PROPERTY ID="DPIX">device DPI, such as 96</PROPERTY>
        <PROPERTY ID="DPIY">device DPI, such as 96</PROPERTY>
        <PROPERTY ID="SHOWSKIN">true or false</PROPERTY>
        <PROPERTY ID="SupportRotation">true or false</PROPERTY>
        <PROPERTY ID="DisplayWidth">screen display width</PROPERTY>
        <PROPERTY ID="DisplayHeight">screen display height</PROPERTY>
        <PROPERTY ID="ColorDepth">color depth used by emulator</PROPERTY>
        <PROPERTY ID="Skin">point to skin XML file, optional</PROPERTY>
        <PROPERTY ID="KeyMapping">point to key mapping XML file, optional</PROPERTY>
    </PROPERTYCONTAINER>
</xsl:element>
</FORMFACTORCONTAINER>
```

Pocket PC platform example:

1. Default form factor is Pocket PC 2003 Portrait.

```
<xsl: attribute name="DefaultFormFactor">POCKET_PC_2003_PORTRAIT</xsl: attribute>
```

2. All supported form factors are listed in a form factor container

```
<FORMFACTORCONTAINER>
<xsl:element name="FORMFACTOR">
    <xsl:attribute name="Name">Pocket PC 2002</xsl:attribute>
    <xsl:attribute name="ID">POCKET_PC_2002</xsl:attribute>
    <PROPERTYCONTAINER>
        <PROPERTY ID="DPIX">96</PROPERTY>
        <PROPERTY ID="DPIY">96</PROPERTY>
        <PROPERTY ID="SHOWSKIN">true</PROPERTY>
        <PROPERTY ID="SupportRotation">false</PROPERTY>
        <PROPERTY ID="DisplayWidth">240</PROPERTY>
        <PROPERTY ID="DisplayHeight">320</PROPERTY>
    </PROPERTYCONTAINER>
</xsl:element>
<xsl:element name="FORMFACTOR">
    <xsl:attribute name="Name">Pocket PC 2003 Landscape</xsl:attribute>
    <xsl:attribute name="ID">POCKET_PC_2003_LANDSCAPE</xsl:attribute>
    <PROPERTYCONTAINER>
        <PROPERTY ID="DPIX">96</PROPERTY>
        <PROPERTY ID="DPIY">96</PROPERTY>
        <PROPERTY ID="SHOWSKIN">true</PROPERTY>
        <PROPERTY ID="SupportRotation">true</PROPERTY>
        <PROPERTY ID="DisplayWidth">320</PROPERTY>
        <PROPERTY ID="DisplayHeight">240</PROPERTY>
    </PROPERTYCONTAINER>
</xsl:element>
<xsl:element name="FORMFACTOR">
    <xsl:attribute name="Name">Pocket PC 2003 Portrait</xsl:attribute>
    <xsl:attribute name="ID">POCKET_PC_2003_PORTRAIT</xsl:attribute>
    <PROPERTYCONTAINER>
        <PROPERTY ID="DPIX">96</PROPERTY>
        <PROPERTY ID="DPIY">96</PROPERTY>
        <PROPERTY ID="SHOWSKIN">true</PROPERTY>
```

-continued

```
        <PROPERTY ID="SupportRotation">true</PROPERTY>
        <PROPERTY ID="DisplayWidth">240</PROPERTY>
        <PROPERTY ID="DisplayHeight">320</PROPERTY>
    </PROPERTYCONTAINER>
</xsl:element>
<xsl:element name="FORMFACTOR">
    <xsl:attribute name="Name">Pocket PC 2003 Square</xsl:attribute>
    <xsl:attribute name="ID">POCKET_PC_2003_SQUARE</xsl:attribute>
    <PROPERTYCONTAINER>
        <PROPERTY ID="DPIX">96</PROPERTY>
        <PROPERTY ID="DPIY">96</PROPERTY>
        <PROPERTY ID="SHOWSKIN">true</PROPERTY>
        <PROPERTY ID="SupportRotation">false</PROPERTY>
        <PROPERTY ID="DisplayWidth">240</PROPERTY>
        <PROPERTY ID="DisplayHeight">240</PROPERTY>
    </PROPERTYCONTAINER>
</xsl:element>
<xsl:element name="FORMFACTOR">
    <xsl:attribute name="Name">Pocket PC 2003 VGA Landscape</xsl:attribute>
    <xsl:attribute name="ID">POCKET_PC_2003_VGA_LANDSCAPE</xsl:attribute>
    <PROPERTYCONTAINER>
        <PROPERTY ID="DPIX">192</PROPERTY>
        <PROPERTY ID="DPIY">192</PROPERTY>
        <PROPERTY ID="SHOWSKIN">true</PROPERTY>
        <PROPERTY ID="SupportRotation">true</PROPERTY>
        <PROPERTY ID="DisplayWidth">640</PROPERTY>
        <PROPERTY ID="DisplayHeight">480</PROPERTY>
    </PROPERTYCONTAINER>
</xsl:element>
<xsl:element name="FORMFACTOR">
    <xsl:attribute name="Name">Pocket PC 2003 VGA Portrait</xsl:attribute>
    <xsl:attribute name="ID">POCKET_PC_2003_VGA_PORTRAIT</xsl:attribute>
    <PROPERTYCONTAINER>
        <PROPERTY ID="DPIX">192</PROPERTY>
        <PROPERTY ID="DPIY">192</PROPERTY>
        <PROPERTY ID="SHOWSKIN">true</PROPERTY>
        <PROPERTY ID=" SupportRotation">true</PROPERTY>
        <PROPERTY ID="DisplayWidth">480</PROPERTY>
        <PROPERTY ID="DisplayHeight">640</PROPERTY>
    </PROPERTYCONTAINER>
</xsl:element>
<xsl:element name="FORMFACTOR">
    <xsl:attribute name="Name">Pocket PC 2003 VGA Square</xsl:attribute>
    <xsl:attribute name="ID">POCKET_PC_2003_VGA_SQUARE</xsl:attribute>
    <PROPERTYCONTAINER>
        <PROPERTY ID="DPIX">192</PROPERTY>
        <PROPERTY ID="DPIY">192</PROPERTY>
        <PROPERTY ID="SHOWSKIN">true</PROPERTY>
        <PROPERTY ID="SupportRotation">false</PROPERTY>
        <PROPERTY ID="DisplayWidth">480</PROPERTY>
        <PROPERTY ID="DisplayHeight">480</PROPERTY>
    </PROPERTYCONTAINER>
</xsl:element>
</FORMFACTORCONTAINER>
```

Figure 4:
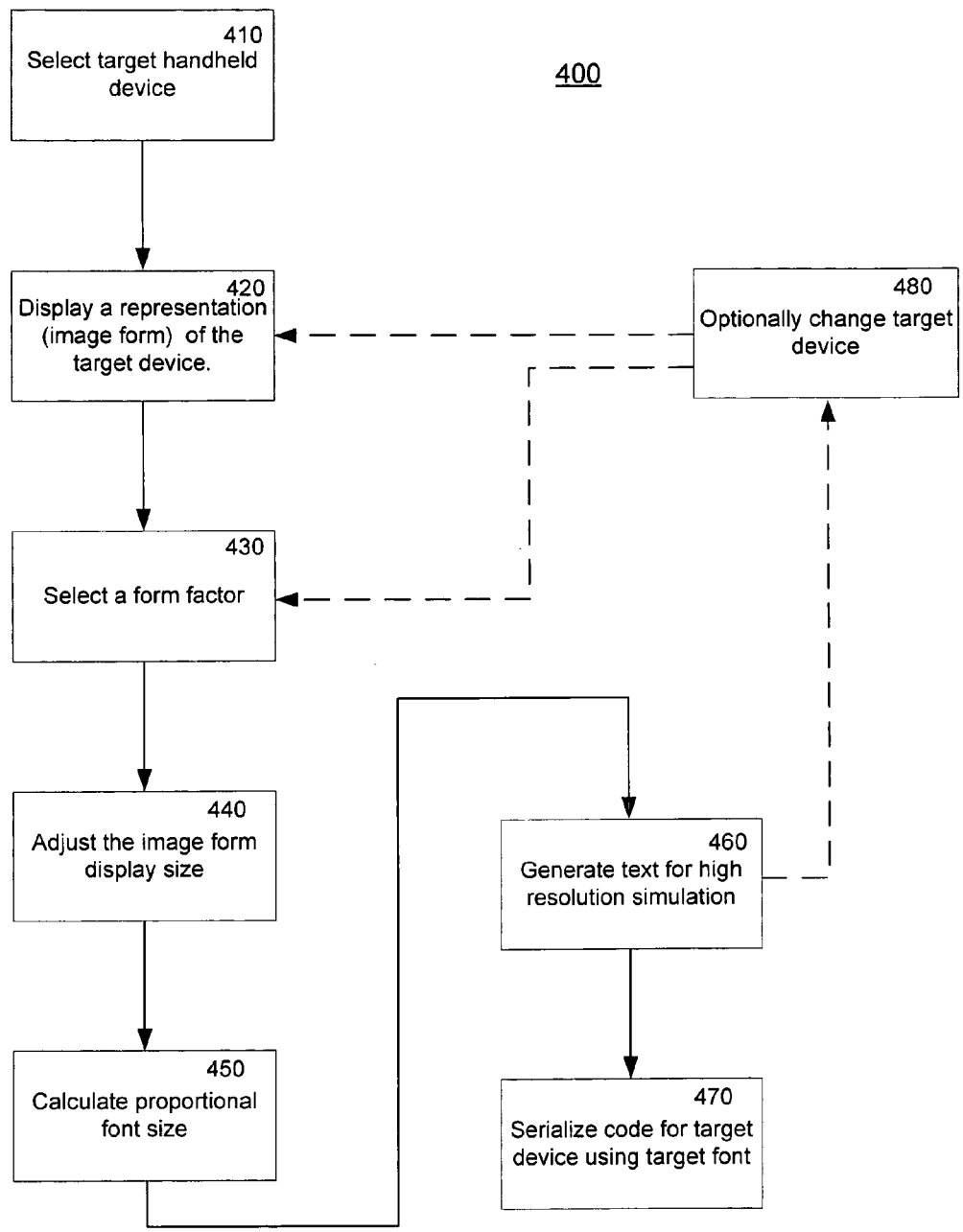
FIG. 4 is a flow diagram for an exemplary method of the invention.

In one aspect of the invention, the development system display resolution may be either higher or lower than the display resolution of the target device. Those of skill in the art will recognize that either a higher or lower display resolution difference between the development system and the target device is possible with the current invention. FIG. 4 is a flow diagram 400 of one embodiment of the invention. On a development system for a handheld digital device, it is assumed, for purposes of example, that the development system display has a lower level display resolution than the target device. Initially, a target device is selected (step 410). The target device could be one of many target devices available to the developer which may be stored in computer memory. After target selection, an image form which represents the target device is displayed (step 420) on the development system display device. A form factor of the target device may then be selected (step 430). The form factor of the device may specify, among other things, the display resolution of the targeted device including the size of the high resolution display in pixels and the linear density of the display in DPI.

Assuming a high resolution target device is selected, the development system then adjusts the image form of the target device (step 440) to accommodate the rendering of a scaled display for the high resolution interface of the target device. A proportional font size for the development system display is calculated (step 450) which allows text to be displayed in proportion to the image body of the target device. The proportionality of the two being such that the development system may simulate a high resolution display of the target device on the low resolution development system display. Thus, the developer may gain an appreciation of the appearance of final text as it will appear on the target device.

The developer may then generate text for the target device (step 460) while appreciating how the high resolution device will appear. Code may be generated or serialized, possibly as a result of a save action, that will be used by the target device.

The font size used during the serialization is a font size that is the program equivalent of the proportional font size used to simulate the development system display. Thus the programmed target device code will appear consistent in proportion to the development system display of target image form and displayed font. In one embodiment, a font size change is implemented by property shadowing. During development time, the font displayed is different in size from the one shown in the property browser. The shadowed font size is incorporated into the control code of the target device when the development code is serialized.

After or during the step of generating text (step 460), the development system user may optionally change (step 480) either the target digital device or the form factor of the target device. Changing the target device allows the programmer to use the text definitions that she created for a new target device. Changing the form factor allows a programmer to select a different display resolution within a device type. Either type of change allows text definition reuse between display resolutions on the same device or text definitions between different devices. These options allow for text design reuse.

Exemplary Computing Device

Figure 5:
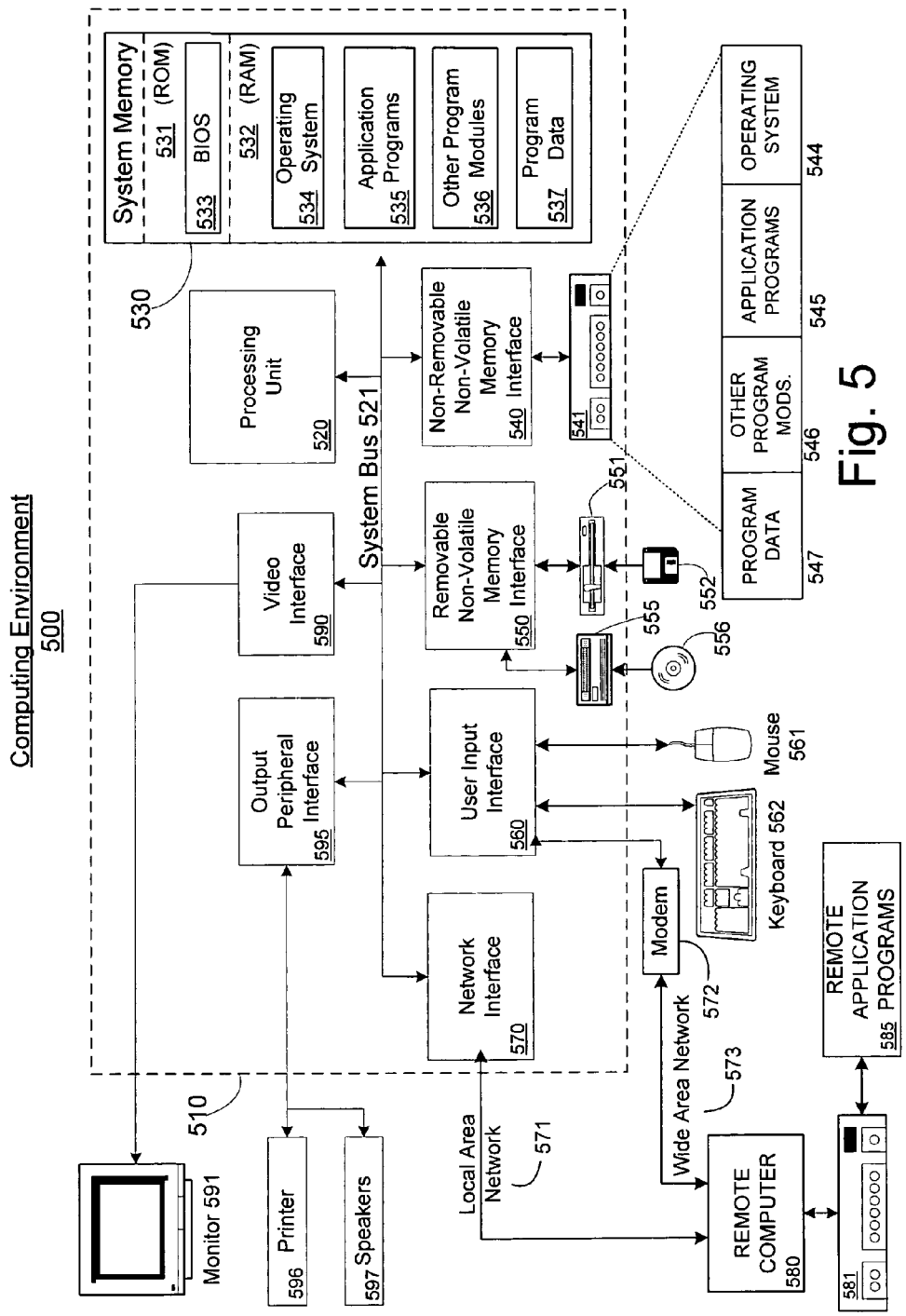
FIG. 5 is a block diagram showing an exemplary computing environment in which aspects of the invention may be implemented.

FIG. 5 and the following discussion are intended to provide a brief general description of a suitable computing environment in which embodiments of the invention may be implemented. While a general purpose computer is described below, this is but one single processor example, and embodiments of the invention with multiple processors may be implemented with other computing devices, such as a client having network/bus interoperability and interaction. Thus, embodiments of the invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

FIG. 5 thus illustrates an example of a suitable computing system environment 500 in which the embodiments of the invention may be implemented, although as made clear above, the computing system environment 500 is only one example of a suitable computing environment and is not intended to suggest any limitation as to the scope of use or functionality of an embodiment of the invention. Neither should the computing environment 500 be interpreted as having any dependency or requirement relating to any one or combination of components illustrated in the exemplary operating environment 500.

With reference to FIG. 5, an exemplary system for implementing an embodiment of the invention includes a general purpose computing device in the form of a computer system 510. Components of computer system 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 510 typically includes a variety of computer readable media. Computer readable media can be any available media that can be accessed by computer system 510 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer system 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer system 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5 provide storage of computer readable instructions, data structures, program modules and other data for the computer system 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer system 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590, which may in turn communicate with video memory (not shown). In addition to monitor 591, computer systems may also include other peripheral output devices such as speakers 597 and printer 596, which may be connected through an output peripheral interface 595.

The computer system 510 may operate in a networked or distributed environment using logical connections to one or more remote computers, such as a remote computer 580. The remote computer 580 may be a personal computer, a server, a router, a network PC, a peer device or other common network node, and typically includes many or all of the elements described above relative to the computer system 510, although only a memory storage device 581 has been illustrated in FIG. 5. The logical connections depicted in FIG. 5 include a local area network (LAN) 571 and a wide area network (WAN) 573, but may also include other networks/buses. Such networking environments are commonplace in homes, offices, enterprise-wide computer networks, intranets and the Internet.

When used in a LAN networking environment, the computer system 510 is connected to the LAN 571 through a network interface or adapter 570. When used in a WAN networking environment, the computer system 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer system 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from Microsoft Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a high resolution handheld device simulation. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of an embodiment of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method of rendering a display simulation of a target digital device on a development system display having a different resolution or form factor, the computer-implemented method comprising:
    selecting a first target digital device, the first target digital device having a first display resolution and a first form factor, the first display resolution or the first form factor being different from the development system display;
    displaying an image form of the selected first target digital device on the development system display;
    adjusting a displayed size of the image form in accordance with the first form factor to accommodate the rendering of the first target digital device display such that the rendering simulates the first display resolution;
    calculating a proportional font size for the first target digital device such that text rendered by the development system display appears proportional to the size of text as if displayed on the first target digital device;
    calculating a relative geometric position the relative geometric position simulating the location of text as if displayed on the first target digital device; and
    displaying text on the development system display in accordance with the proportional font size and the relative geometric position to simulate the first target digital device.

2. The method of claim 1, further comprising:
    creating text to be displayed on the first target digital device; and
    generating code for the first target digital device, the generated code controlling a font size to render the text in approximate proportion to that displayed on the development system display with respect to the image form.

3. The method of claim 1, further comprising:
    selecting a second form factor for the first target digital device; and
    adjusting the displayed size of the image form in accordance with the second form factor such that text rendered by the development system display appears proportional to a size of the text if displayed on the first target digital device display.

4. The method of claim 3, further comprising:
    creating text to be displayed on the first target digital device; and
    generating code for die first target digital device, the generated code controlling a font size to render the text in approximate proportion to that displayed on the development system display with respect to the image form.

5. The method of claim 1, further comprising:
    selecting a form factor for a second target digital device; and
    adjusting the displayed size of the image form in accordance with the second form factor such that text rendered by the development system display appears proportional to a size of the text if displayed on the second target digital device display.

6. The method of claim 5, further comprising:
    creating text to be displayed on the second target digital device; and
    generating code for the second target digital device, the generated code controlling a font size to render the text in approximate proportion to that displayed on the development system display with respect to the image form.

7. The method of claim 1, wherein the first display resolution is greater than the display resolution of the development system display.

8. The method of claim 1, wherein the first display resolution is less than the display resolution of the development system display.

9. A computer system for development of one or more target devices, the system comprising:
    a display for viewing a target device;
    a memory store, having at least one target device image;
    a processor, having access to computer memory having instructions, the instructions, when executed, performing a method comprising:
    selecting a first target digital device, the first target digital device having a first display resolution and a first form factor, the first display resolution or the first form factor being different from the display;
    displaying an image form of the selected first target digital device on the display;
    adjusting a displayed size of the image form in accordance with the first form factor to accommodate the rendering of the first target digital device display such that the rendering simulates the first display resolution;
    calculating a proportional font size for the first target digital device such that text rendered by the display appears proportional to the size of text as if displayed on the first target digital device;
    calculating a relative geometric position, the relative geometric position simulating the location of text as if displayed on the first target digital device; and
    displaying text on the display in accordance with the proportional font size and the relative geometric position to simulate the first target digital device.

10. The system of claim 9, wherein the method further comprises:
    creating text to be displayed on the first target digital device; and
    generating code for the first target digital device, the generated code controlling a font size to render the text in approximate proportion to that displayed on the display with respect to the image form.

11. The system of claim 9, wherein the method further comprises:

selecting a second form factor for the first target digital device; and adjusting the displayed size of the image form in accordance with the second form factor such that text rendered by the display appears proportional to a size of the text if displayed on the first target digital device display.

12. The system of claim 9, wherein the method further comprises:

selecting a form factor for a second target digital device; and adjusting the displayed size of the image form in accordance with the second form factor such that text rendered by the display appears proportional to a size of the text if displayed on the second target digital device display.

13. The system of claim 12, wherein the method further comprises:

creating text to be displayed on the second target digital device; and generating code for the second target digital device, the generated code controlling a font size to render the text in approximate proportion to that displayed on the display with respect to the image form.

14. A computer-readable storage medium having computer-executable instructions for performing a method of displaying a simulation of a target digital device on a development system display having a different resolution or form factor, the method comprising:

selecting a first target digital device, the first target digital device having a first display resolution and a first form factor, the first digital display resolution or the first form factor being different than the development system display;

displaying an image form of the selected first target digital device on the development system display;

adjusting a displayed size of the image form in accordance with the first form factor to accommodate the rendering of the first target digital device display such that the rendering simulates the first display resolution;

calculating a proportional font size for the first target digital device such that the text rendered by the development system display appears proportional to the size of text as if displayed on the first target digital device;

calculating a relative geometric position, the relative geometric position simulating the location of text as if displayed on the first target digital device; and displaying text on the development system display in accordance with the proportional font size and the relative geometric position to simulate the first target digital device.

15. The computer-readable storage medium of claim 14, the method further comprising:

creating text to be displayed of the first target digital device; and generating code for the high resolution display of the target digital device, the generated code having a font size to render the text in approximate proportion to that displayed on the development system display with respect to the image form.

16. The computer-readable storage medium of claim 14, the method further comprising:

selecting a second form factor for the first target digital devices; and adjusting the displayed size of the image font in accordance with the second form factor such that text rendered by the development system display appears proportional to a size of the text if displayed on the first target digital device display.

17. The computer-readable storage medium of claim 16, the method further comprising:

creating text to be displayed on the first target digital device; and generating code for the high resolution display of the target digital device, the generated code controlling a font size to render the text in approximate proportion to that displayed on the development system display with respect to the image form.

18. The computer-readable storage medium of claim 14, the method further comprising:

selecting a form factor for a second target digital device; and adjusting the displayed size of the image form in accordance with the second form factor such that text rendered by the development system display appears proportional to a size of the text if displayed on the second target digital device display.

19. The computer-readable storage medium of claim 18, the method further comprising:

creating text to be displayed on the second target digital device; and generating code for the second target digital device, the generated code controlling a font size to render the text in approximate proportion to that displayed on the development system display with respect to the image form.

20. The computer-readable storage medium of claim 14, wherein the first display resolution is one of greater than and less than the display resolution of the development system display.

* * * * *